May 10, 1927.
J. T. DONAHOE
1,628,493
ELECTRIC SIGNALING SYSTEM
Filed Aug. 13, 1925  2 Sheets-Sheet 1
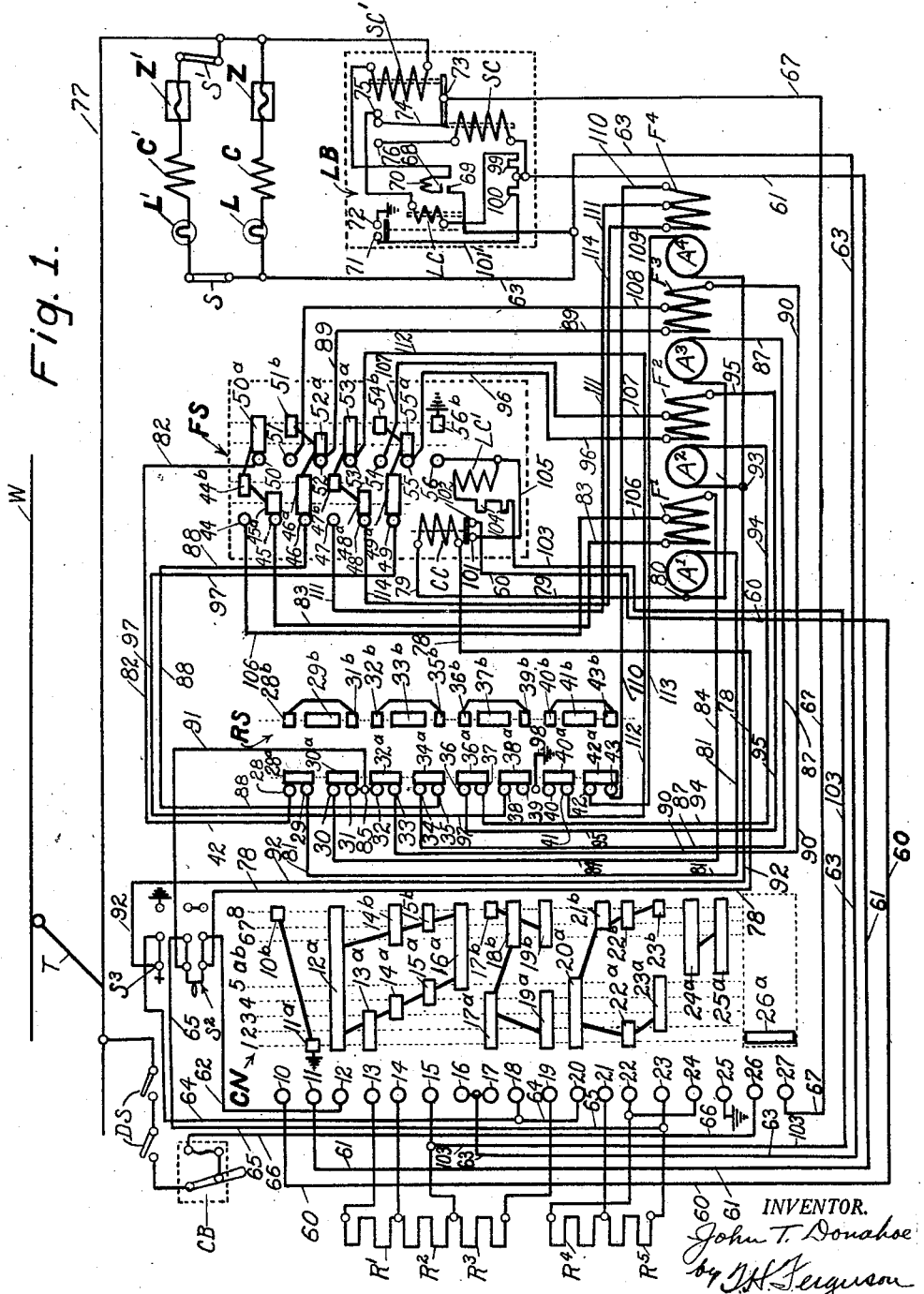
INVENTOR.
John T. Donahoe
by J.H. Ferguson
ATTORNEY.

May 10, 1927.    1,628,493
J. T. DONAHOE
ELECTRIC SIGNALING SYSTEM
Filed Aug. 13, 1925    2 Sheets-Sheet 2
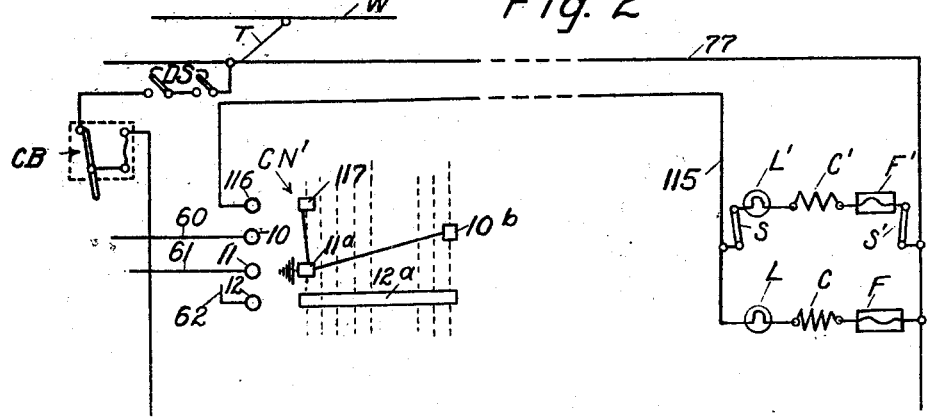
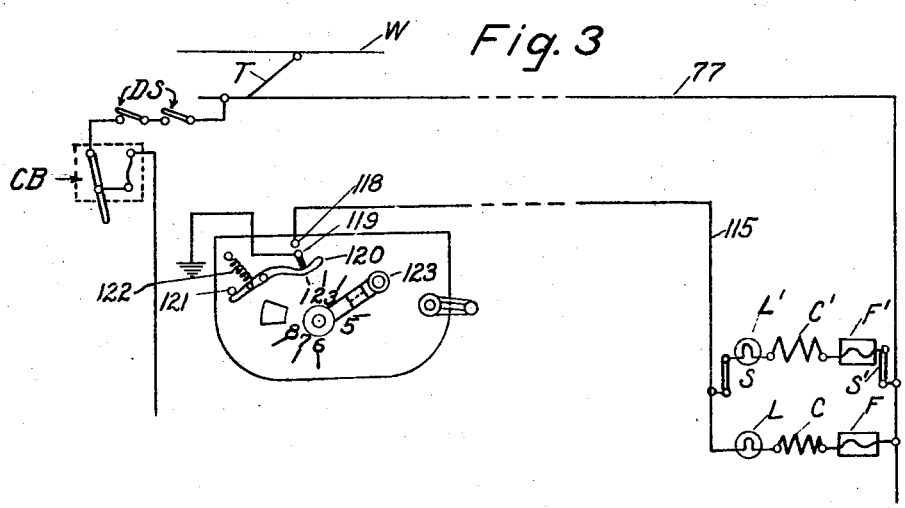
INVENTOR.
John T Donahoe
BY T. H. Ferguson
ATTORNEY.

Patented May 10, 1927.

1,628,493

UNITED STATES PATENT OFFICE.

JOHN T. DONAHOE, OF CHICAGO, ILLINOIS.

ELECTRIC SIGNALING SYSTEM.

Application filed August 13, 1925. Serial No. 49,943.

The present invention relates generally to electric signaling systems wherein both power and signaling circuits are inter-related and more particularly to such systems in electrically driven or controlled vehicles, such as busses, street cars, and the like.

In its specific form the invention has been worked out in connection with electrically operated street cars, and it will accordingly be described as so applied, although it will be apparent that the invention is applicable to other vehicles and useful in other relations.

The invention has to do with signaling automatically from the front end of the vehicle to the rear, and, where a trailer is used, to the trailer; thus, in the case of a street car, signaling from a motorman at the front end of the car to a conductor at the rear end of the same car, and, where a trailer is in use, also a trainman in the trailer.

It has been usual heretofore merely for the conductor to signal the motorman and in certain automatic systems the doors of the car have been interlocked with the controller in such a way that a car cannot be started until the doors are closed.

But the introduction of the crossing policeman and traffic control signals has brought to light defects in these prior art equipments. In ordinary operation, the conductor does not know whether the traffic signal indication is to "go" or "stop", and accordingly he makes every effort to close the doors of the car as soon as possible in order to allow the car to proceed. Passengers attempting to board the car frequently find the doors closed and yet the car does not move because of an adverse traffic signal. The resulting delay and inconvenience to the passengers is considerable and often there is friction between the trainmen and passengers because the doors are not opened and the passengers allowed to board the car.

The principal object of the invention is to overcome the difficulties growing out of this inability of the conductors to know whether the car may proceed or not. This object is attained by combining with the power circuits and controller of the car a signaling circuit in such a way that when the motorman is in readiness to proceed, by reason of the clear way before him, the conductor will be apprized of that fact.

Preferably, the signaling circuit is so associated with the controller and the starting circuit of the car that when the motorman moves his controller to the starting position, the car will either start or a signal will be displayed before the conductor to indicate that the traffic conditions are such that the car may proceed.

The starting circuit of the motors of the car is controlled at two points. One of these is under the control of the motorman, and the other requires the manipulation of certain parts by the conductor. The former control is exercised by the motorman's controller and the latter is preferably accomplished by the manipulation of the doors under the conductor's control. With this arrangement, if the doors are closed when the motorman moves his controller to close his portion of the starting circuit, the car starts at once. If the doors are open, the car stands, notwithstanding the movement of the controller to its starting position, until the doors are closed; whereupon the car starts.

In the preferred form of the invention, the signal is not displayed unless the conductor's portion of the starting circuit is open, that is to say, unless the doors are open. In other embodiments, however, I provide for the display of the signal whenever the motorman's controller rests in starting position, no matter what the condition of the conductor's portion of the starting circuit.

With my system installed upon the car, a most satisfactory operation of the same is obtainable. When the car approaches an intersection where a passenger stop is to be made, the conductor, as heretofore, opens his doors to allow passengers to board or leave the car but, instead of closing them as soon as possible, he leaves them open until he receives the signal from the motorman that the traffic conditions are favorable to proceeding. The motorman, having brought his car to a stop, waits for the traffic signal with his controller in the "off" or open position, and when he receives the traffic signal to go, he moves his controller to the first point and thereby closes his portion of the starting circuit. This movement of the controller also signals the conductor that everything is clear in front and that the car is ready to proceed. The conductor then closes his doors as quickly as possible. The closing of the doors completes the conductor's portion of the starting circuit and the car at once starts. If for any reason the conductor closes his doors before receiving the signal from the motorman, then, of course, the movement of the controller to the first point causes the car to start at once.

Having set forth the general nature of the invention, attention is now directed to the accompanying drawings and the following detailed description wherein the invention is more particularly disclosed, reference being had to the claims for the scope of the invention.

In said drawings, Fig. 1 is a diagram of the electrical circuits of a street car power and signaling system constructed and arranged in accordance with the present invention; Fig. 2 is a diagram of a portion of the controller connections and signaling circuit of a modified arrangement; and Fig. 3 is a similar diagram illustrating a further modification wherein the signaling circuit is controlled by contacts actuated by the handle of the controller. Throughout these views like characters refer to like parts.

Referring to the drawings in detail, and more particularly at first to the circuit diagram of Fig. 1, CN designates the motorman's controller, RS the reversing switch, FS the field control switch, LB the line breaker, $A^1$, $A^2$, $A^3$, $A^4$, the motor armatures, $F^1$, $F^2$, $F^3$, $F^4$ their field windings respectively, L the signal before the conductor, $L^1$ that before a trainman in the trailer, DS the door switches under the conductor's control, CB the circuit breaker, and $R^1$, $R^2$, $R^3$, $R^4$, $R^5$ the resistance grids for inclusion in the power circuits of the motor.

The controller CN is an 8-point controller having a ratchet switch. It comprises 18 contact fingers designated 10 to 27 inclusive and associated segmental contacts having like numbers with exponents "a" and "b," all connected as illustrated. The eight positions of the fingers as they engage the segments are indicated by the vertical dotted lines bearing at their upper ends the numerals 1 to 8 inclusive. The ratchet switch upon the controller is of usual construction and by it contacts 26 and 27 are bridged by contact $26^a$ as soon as the controller reaches its first closed position, and such electrical connection is continued as long as the controller handle is advanced, but as soon as the direction of movement of the controller handle is reversed the circuit between contacts 26 and 27 is broken. The mechanical arrangement of the controller parts including the ratchet switch is the usual one and need not be particularly illustrated and described.

The resistance grids are connected by end and intermediate taps to certain contacts of the controller. Thus grid $R^1$ is connected between contacts 13 and 14, grid $R^2$ between contacts 14 and 15, grid $R^3$ between contacts 15 and 19, grid $R^4$ between contacts 22 and 21, and grid $R^5$ between contacts 21 and 23. Contact 10 is connected by conductor 60 to one of the control contacts of the field switch FS. Contact 11 is connected by conductor 61 to one terminal of the lifting coil LC of the line breaker LB. Contact 12 is connected by conductor 62 to one of the lower contacts of switch $S^2$. Contacts 16 and 17 are connected by conductor 63 to one of the main terminals of the line breaker LB. Contacts 18 and 20 are connected by conductor 64 to one of the contacts of switch $S^3$. Contact 23 is connected by conductor 65 to one of the upper contacts of switch $S^2$. Contact 24 is connected directly to contact 22. Contact 25 is connected to ground. Contact 26 is connected by conductor 66 to one terminal of the circuit breaker CB. Contact 27 is connected by conductor 67 to an auxiliary switch upon the line breaker LB.

The reversing switch RS is of usual construction and includes contact fingers designates 28 to 43 inclusive, which cooperate with similarly designated contact segments, the designations in the first position having corresponding numerals with the exponent a, and in the reverse position like numerals with the exponent b. The switch is shown with the fingers enclosed upon the segments which give the forward operation of the motors. The mechanical arrangement of this switch is the usual one and need not be particularly illustrated and described.

The field control switch FS is an electromagnetically operated switch for cutting out certain of the field windings of the motors to increase the speed of the same. It is of well known construction and comprises contact fingers designated 44 to 56 inclusive, cooperating with associated segmental contacts designated by corresponding numerals with the exponents a and b. The switch is shown in one contact engaging position. It is moved to the other contact engaging position by the actuation of the lifting coil $LC^1$.

Line breaker LB comprises two main contacts 68 and 69 associated with a blow-out coil 70. The lifting coil LC is actuated to make and break circuit at the contacts 68, 69. An auxiliary circuit is also made and broken between contacts 71 and 72 by the same operation of the lifting coil LC. The circuit of the latter coil is controlled by switch coils SC and $SC^1$ which act upon an armature 73 to hold it normally in position to close contact 74 upon contact 75. When the coils SC and $SC^1$ are energized, then contact 74 closes circuit with contact 76. This breaker is of usual construction and its mechanical arrangement need not be particularly described.

The door switches DS are in series circuit with the circuit breaker CB and the trolley conductor T. These switches are located on the door engines and are open when the doors are open, and closed when the doors are closed. They are under the direct control of the conductor.

The various circuit connections will be best understood by briefly describing the operation of the system. If it be assumed that the car is standing and the controller CN is in the off position and the reversing switch thrown for forward movement, then the parts will occupy the positions illustrated. This is the normal condition when the car is at rest. If, now, the motorman has his door closed and a favorable traffic signal confronts him, then he at once throws his controller to the first position and thereby completes a circuit through the signal L, which is preferably an incandescent lamp, to apprize the conductor of the fact that the car may proceed. This circuit may be traced from the trolley wire W through trolley conductor T, conductor 77, fuse Z, resistance coil C, lamp L, conductor 63, controller contacts 17, 17$^a$, 19$^a$, 19, resistance grids R$^3$, R$^2$, R$^1$, controller contacts 13, 13$^a$, 12$^a$, 12, conductor 62, lower contacts of switch S$^2$, conductor 78, control coil CC of the reversing switch FS, conductor 79 to point 80, where the current divides, one half passing through armature A$^1$, conductor 81, the reversing switch contacts 29, 28$^a$, 28, conductor 82, field switch contacts 50, 50$^a$, 44$^b$, 45$^a$, 45, conductor 83, field winding F$^1$, conductor 84, reversing switch contacts 30, 30$^a$, 31, to point 85, the other half passing from point 80 through conductor 86, armature A$^3$, conductor 87, reversing switch contacts 34, 34$^a$, 35, conductor 88, field switch contacts 46, 46$^a$, 52$^a$, 52, conductor 89, field winding F$^3$, conductor 90, reversing switch contacts 33, 32$^a$, 32, to point 85, there the current through both paths uniting and extending through conductor 91, the upper contacts of switch S$^2$, conductor 65, resistance grids R$^5$, R$^4$, controller contacts 22, 22$^a$, 20$^a$, 20, conductor 64, contacts of switch S$^3$, conductor 92, to point 93, there again the current dividing, one half passing through armature A$^2$, the conductor 94, the reversing switch contacts 37, 36$^a$, 36, conductor 95, field winding F$^2$, conductor 96, field switch contacts 55, 55$^a$, 49$^a$, 49, conductor 97, reversing switch contacts 38, 38$^a$, 39, to ground at 98, and the other half passing through armature A$^4$, conductor 113, reversing switch contacts 42, 42$^a$, 43, conductor 110, field winding F$^4$, conductor 114, field switch contacts 48, 48$^a$, 47$^b$, 53$^a$, 53, conductor 112, reversing switch contacts 41, 40$^a$, and 40, to ground at 98. The closing of this circuit, as before noted, lights lamp L. The conductor, knowing that the conditions are favorable to the starting of the car, closes his doors as soon as possible and thereby closes door switches DS. As soon as this is done, the circuit is completed for the actuation of the line breaker LB. When thus actuated, a circuit is completed in shunt of the branch including lamp L, coil C, and fuse Z, and thereupon the lamp L is extinguished and the signal no longer displayed. The circuit by which the line breaker is actuated may be traced from the trolley line W through trolley conductor T, door switches DS, circuit breaker CB, conductor 66, ratchet switch contacts 26, 26$^a$, 27, conductor 67, armature 73, contacts 74, 75, lifting coil LC, resistance 99, conductor 61, and controller contacts 11, 11$^a$ to ground. The closing of this circuit actuates coil LC and promptly closes the main contacts 68, 69 of the breaker LB, thereby short-circuiting the lamp L, as before noted. The closing of the auxiliary contacts 71, 72 by the actuation of coil LC provides an additional path to ground through resistance 100, conductor 101$^1$, and closed contacts 71, 72. This path allows sufficient current to flow through coil LC to hold contacts 68, 69 closed even when the controller is moved to the next point and the ground on conductor 61 at controller contacts 11, 11$^a$ thus removed. The presence of this circuit maintains the line breaker closed until the circuit just traced is opened at the circuit breaker CB, the door switches DS, the ratchet switch contacts 26, 27, or at the line breaker itself by the actuation of the overload coil SC$^1$. While the line breaker LB remains open the current flowing through the shunt path including the signal lamp L, is not sufficient to start the motors, being ordinarily not more than about ½ ampere. However, as soon as the line breaker is closed the flow of current over the starting circuit, which excludes the lamp L, is sufficient to set the motors in operation.

In case of an overload on the motors, coil SC$^1$, being in the main power circuit, pulls up armature 73 and thereby opens contacts 74, 75, and closes contacts 74, 76. The opening of contacts 74, 75 breaks the circuit of coil LC and allows contacts 68, 69 to open, but at the same time coil SC is energized over a circuit which may be traced from wire W, through trolley pole T, door switches DS, switch CB, conductor 66, ratchet switch contacts 26, 26$^a$, 27, conductor 67, armature 73, contacts 74, 76, coil SC, resistor 100, conductor 101$^1$, and closed contacts 71, 72 to ground. This energization of coil SC holds contacts 74, 76 closed, coil SC$^1$ being now deenergized and no longer able to perform this function. The coil SC$^1$ will continue to hold contacts 74, 76 closed even after the overload is removed and it is necessary for the motorman to move the controller handle to the off position in order to deenergize the coil SC.

Thus far I have dealt only with the first closed position of the controller. The subsequent positions vary the motor connections in order to bring about the proper operation of the motors. These in themselves constitute no part of the present invention but for the sake of having a full and clear disclosure, may be briefly considered. The movement of the controller CN to its second position removes the ground from conductor 61, but, as previously noted, a ground at contacts 71, 72 of the line breaker LB replaces the ground previously furnished by controller 11ª. The only effect of moving the controller to the second position is to remove resistance grids $R^4$ and $R^5$ from the circuit previously traced. In like manner the movement of the controller to its third position changes the circuit established by the second position only to the extent of removing resistance grid $R^1$ from the circuit. Likewise the shifting of the controller to the fourth position removes resistance grid $R^2$ from circuit, and a similar movement to the fifth position removes resistance grid $R^3$.

In shifting from the fifth position to the sixth, the motors are thrown into a different arrangement of parallel circuits. The circuit established by the sixth position may be traced from the trolley wire W through conductors T, 77, line breaker LB, conductor 63, controller contacts 16, 16ª, 12ª, 12, conductor 62, switch $S^2$, conductor 78, control switch coil CC, conductor 79 to point 80, there dividing as before traced, two branches extending between points 80 and 85, one through armature $A^1$ and its field winding $F^1$, and the other through armature $A^3$ and its field winding $F^3$, then from point 85 continuing through conductor 91, switch $S^2$, conductor 65, resistance grids $R^5$, $R^4$, and controller contacts 24, 24ª, 25ª, 25 to ground. There is also another branch path which may be traced from controller contact 16 through contacts 16ª, 14ᵇ, 14, resistance grids $R^2$, $R^3$, controller contacts 19, 19ᵇ, 18ᵇ, 18, conductor 64, switch $S^3$, conductor 92, to point 93, there dividing, one half passing through armature $A^2$ and its field winding $F^2$, and the other half through armature $A^4$ and its field winding $F^4$, as previously traced, the two branches connecting to ground at the point 98. The movement of the controller to the seventh position merely alters the circuit of position 6 to the extent of removing, first, resistance grid $R^2$ from the branch circuit including armatures $A^2$ and $A^4$, and second, the resistance grid $R^4$ from the branch circuit including armatures $A^1$ and $A^3$. The further movement of the controller to the eighth position removes resistance grid $R^3$ from the former branch circuit, and $R^5$ from the latter, thus removing all resistances from the motor circuit.

It will also be noted that when the controller CN reaches its eighth position, the conductor 60 is grounded through controller contacts 10, 10ᵇ, and 11ª. The effect of such grounding is to complete an energizing circuit for the lifting coil $LC^1$ of the field control switch FS. As previously noted, the purpose of this switch is to still further increase the speed of the motors by cutting out portions of the field windings $F^1$, $F^2$, $F^3$, $F^4$. A consideration of the previous circuits of the motors will show that current passing to the motors must pass through the controlling coil of control switch CC. Now, with the controller in the eighth position, as the speed of the car increases, the amount of current passing through the coil of switch CC falls off and finally it reaches a point where the bridging contact drops into engagement with contacts 101, 102, and thereby completes a circuit for the lifting coil $LC^1$ of the field control switch FS. This circuit may be traced from wire W through conductors T, 77, the line breaker LB, conductor 63, controller contacts 16, 16ª, 15ᵇ, 15, conductor 103, protective resistance 104, coil $LC^1$, conductor 105, closed contacts 101, 102, conductor 60, controller contacts 10, 10ᵇ, and 11ª, to ground. The completion of this circuit causes coil $LC^1$ to throw the switch FS to its alternate position, thereby replacing the ground connection initially established through conductor 60 and switch CC by a connection to ground through field switch contacts 56, 56ᵇ. In this way the field switch FS is held in its alternate position until the circuit is broken at contacts 101, 102 by an increase of current in coil CC or at controller contacts 15, 15ᵇ when the controller is moved in the reverse direction.

The effect of the operation of the switch FS is to change the number of field windings in circuit. Thus in the case of field winding $F^1$ the former circuit between conductors 84 and 83 is replaced by a circuit between conductors 84 and 106, the latter conductor being connected to conductor 82 by a path including field switch contacts 44, 44ᵇ, 50ª, and 50. In like manner the circuit of field winding $F^2$ between conductors 95 and 96 is replaced by that between conductors 95 and 107, the latter conductor being connected to conductor 97 over a path including field switch contacts 54, 54ᵇ, 55ª, 49ª, and 49. Similarly in the case of field winding $F^3$ the circuit between conductors 90 and 89 is replaced by one between conductors 90 and 108, and the latter is placed in circuit with conductor 88 over a path including field switch contacts 51, 51ᵇ, 52ª, 46ª, and 46. And finally in the case of field winding $F^4$, the circuit between conductors 109 and 110 is replaced by that between 110 and 111, the latter being connected to conductor 112 through field switch contacts 47, 47ᵇ, 53ª, and 53.

It will be noted that during all these operations of the controller and other apparatus following the first closed position, the signal L will be short-circuited by the contacts 68 and 69 of the line breaker LB and, consequently, no signal will be displayed. The placing of the signal L in a path in shunt to the contacts 68 and 69 of the line breaker does not in any way interfere with the operation of the car motors. The signal is displayed only when the controller is on the first point and the car doors are open. It will be clear from the drawing that if a second branch circuit including the signal $L^1$, coil $C^1$, and fuse $Z^1$, is employed, there will be a display of both signals L and $L^1$ whenever the controller is on the first point and the doors are open. In the diagram the switches S and $S^1$ indicate the connections between cars, which would be flexible connections such as are now commonly employed. The resistance in the parallel paths, including the signals L and $L^1$, should be such that the closing of the signaling circuit will prevent sufficient current to flow to start the motors. This is a mere matter of engineering.

The hand switches $S^2$ and $S^3$ are for disconnecting the motors in sets of two, the switch $S^2$ for the motors having armatures $A^1$ and $A^3$ and switch $S^3$ for the motors having armatures $A^2$ and $A^4$.

Instead of simply connecting the branch circuit of the signal L across the terminals of the line breaker, I may arrange the signaling circuit so as to be under control of contacts upon the motorman's controller. Such arrangements are illustrated in Figs. 2 and 3. In the former the conductor 77 connects with one end of the branch circuit, or circuits, as the case may be, and the other end of the circuit, or circuits, is connected by conductor 115 to an extra finger 116 upon the controller $CN^1$. The latter engages contact 117 whenever the controller is in its first position. Contact 117 is connected with $11^a$, which is grounded. The result then is that every time the controller is moved to its first position a circuit is established through the signal L, $L^1$, by way of contacts 116, 117 and $11^a$. In this figure the other parts of the controller are the same as shown in Fig. 1. A few numerals have been added to show the correspondence between them.

In the modification shown in Fig. 3 the same circuit is employed as in Fig. 2 but the ground connection is controlled by contacts 118 and 119. As illustrated, the contact 118 is fixed and the contact 119 is mounted on a pivoted lever 120 which is normally held in open position against a stop 121 by a tension spring 102. The lever 120 is positioned so that when the controller handle 123 is moved to the first controller position it will engage the lever 120 to move contact 119 into engagement with contact 118 and thereby close the signaling circuit previously described. In this instance, the controller contact arrangement would be the same, as shown more fully in Fig. 1.

These modifications show that it is possible to arrange the signal circuit in various ways and still perform the desired functions. In the case of Figs. 2 and 3 the signaling circuit is directly under the control of the motorman and the conductor does not exercise any control over it. In this way these modifications differ somewhat from the preferred form of the invention. The line breaker, however, is under the control of the door switches DS, just as before, and the motorman cannot start the car unless the doors are closed.

It may be further noted that if two motor cars are coupled together, then the controller of the second car is cut out of circuit and the line breakers of the two cars are connected in series. In such event, with the embodiment of the invention illustrated in Fig. 1, there is a signal L in parallel with each line breaker and the line breaker of each car is under the control of the conductor or trainman of that particular car. Consequently, the closing of each line breaker short-circuits the associated signal and extinguishes it.

It is clear that where the term "conductor" is used in the claims it may mean the trainman in the trailer as well as the conductor on the first car, for in the event a trailer is in use then one of the door switches DS will be a switch at the door of the trailer and then both the conductor on the first car and the trainman on the trailer will have control of the energizing circuit of the line breaker LB. The term may apply also to a trainman in the second car where the latter is a motor car as well as a trailer without motors.

The term "motorman" is used to describe that person who in the control of the vehicle has a clear view of the road ahead and is located at the front end of the car or train. The term is broadly used to include a bus driver or other person having direct and main control of the operation of the vehicle.

Modifications of the invention other than those disclosed may obviously be made without departing from its spirit and scope. I therefore do not wish to be limited to the exact embodiments herein disclosed, but aim to cover by the terms of the appended claims all modifications and alterations of the same which lawfully come within the scope of the invention.

What I claim as new and desire to secure by a patent of the United States is:

1. An electrical system of the class described comprising a motor-starting circuit normally open at a plurality of points, a motorman's controller for closing said starting circuit at certain of said points thereby partially completing said starting circuit, an electrically operated signal before the conductor, means including circuit connections whereby said signal is operated to indicate such partial completion of said starting circuit, and means under the conductor's control for thereupon closing said starting circuit at the remainder of said points thereby fully completing said starting circuit.

2. An electrical system of the class described comprising a motor-starting circuit normally open at a plurality of points, a path for current shunting one of said points, a signal operated by current through said path when said starting circuit is open at said shunt point, a motorman's controller for closing said starting circuit at unshunted points to complete a signaling circuit, through said shunt path, means for causing current to flow through said signaling circuit to operate said signal and means under the conductor's control for short-circuiting said shunt path to change the condition of said signal and to complete the starting circuit.

3. An electrical system of the class described comprising a motor-starting circuit normally open at a plurality of points, a motorman's controller for closing said starting circuit at certain of said points thereby partially completing said starting circuit, an electrically operated signal before the conductor, means including circuit connections for displaying said signal to indicate such partial completion of said starting circuit, an electromagnetically operated switch for closing said starting circuit at the remainder of said points and negativing the display of said signal, and means under the conductor's control for actuating said electromagnetically operated switch.

4. An electrical system of the class described comprising a motor-starting circuit normally open at a plurality of points, a motorman's controller movable to its first position to close said circuit at one of said points, means normally operative to display a signal before the conductor in response to the movement of said controller to its first position, and means under the conductor's control for subsequently completing said starting circuit and discontinuing the display of said signal.

In witness whereof, I hereunto subscribe my name this 11th day of August, 1925.

JOHN T. DONAHOE.